US009509778B2

(12) United States Patent
Yu

(10) Patent No.: US 9,509,778 B2
(45) Date of Patent: Nov. 29, 2016

(54) SIP-BASED METHOD, APPARATUS AND SYSTEM FOR SECURE COMMUNICATION BETWEEN MTC DEVICES

(71) Applicant: ZTE Corporation, Shenzhen, Guangdong (CN)

(72) Inventor: Wantao Yu, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 14/441,041

(22) PCT Filed: Oct. 31, 2013

(86) PCT No.: PCT/CN2013/086373
§ 371 (c)(1),
(2) Date: May 6, 2015

(87) PCT Pub. No.: WO2014/075561
PCT Pub. Date: May 22, 2014

(65) Prior Publication Data
US 2015/0264140 A1 Sep. 17, 2015

(30) Foreign Application Priority Data

Nov. 15, 2012 (CN) .......................... 2012 1 0460733

(51) Int. Cl.
*G06F 15/16* (2006.01)
*H04L 29/08* (2006.01)
(Continued)

(52) U.S. Cl.
CPC ........... *H04L 67/141* (2013.01); *H04L 65/105* (2013.01); *H04L 65/1006* (2013.01); *H04L 67/142* (2013.01); *H04W 4/005* (2013.01); *H04W 12/06* (2013.01)

(58) Field of Classification Search
CPC . H04L 67/141; H04L 67/142; H04L 65/105; H04L 65/1006; H04W 12/06; H04W 4/005
See application file for complete search history.

(56) References Cited

U.S. PATENT DOCUMENTS 8,301,883 B2 * 10/2012 Sundaram ............. H04L 9/0825
380/270
2010/0049980 A1 2/2010 Barriga
(Continued)

FOREIGN PATENT DOCUMENTS

CN 102469455 A 5/2012
CN 102571717 A 7/2012
(Continued)

OTHER PUBLICATIONS

Supplementary European Search Report in European application No. 13855399.5, mailed on Oct. 14, 2015.
(Continued)

*Primary Examiner* — John Macilwinen
(74) *Attorney, Agent, or Firm* — Oppedahl Patent Law Firm LLC

(57) ABSTRACT

Provided is a SIP-based method for secure communication between MTC devices, including that an SIP server establishes a secure connection with a source MTC device and a secure connection with a target MTC device respectively through a GBA manner or a GBA-push manner, the SIP server generates an application layer session key, sends the application layer session key to the source MTC device through the secure connection between the SIP server and the source MTC device, and sends the application layer session key to the target MTC through the secure connection between the SIP server and the target MTC device. A SIP-based system and apparatus for secure communication between MTC devices are also provided. The establishment of a secure connection between MTC devices based on an SIP protocol can be implemented.

17 Claims, 7 Drawing Sheets

(51) Int. Cl.
*H04W 4/00* (2009.01)
*H04W 12/06* (2009.01)
*H04L 29/06* (2006.01)

(56) References Cited

U.S. PATENT DOCUMENTS

2010/0268937 A1* 10/2010 Blom .................... H04L 63/061
    713/153
2011/0010768 A1* 1/2011 Barriga ............... H04L 63/0428
    726/11
2012/0302229 A1 11/2012 Roenneke

FOREIGN PATENT DOCUMENTS

CN    102572818 A    7/2012
WO    2011098150 A1    8/2011

OTHER PUBLICATIONS

3GPP TS 33.223 version 11.0.0 Release 11, mailed on Oct. 1, 2012.
3GPP TS 33.220 version 8.9.0 Release 8, mailed on Mar. 1, 2012.
International Search Report in international application No. PCT/CN2013/086373, mailed on Feb. 20, 2014.
English Translation of the Written Opinion of the International Search Authority in international application No. PCT/CN2013/086373, mailed on Feb. 20, 2014.

* cited by examiner

SIP-BASED METHOD, APPARATUS AND SYSTEM FOR SECURE COMMUNICATION BETWEEN MTC DEVICES

TECHNICAL FIELD

The disclosure relates to the technical field of wireless communications, and particularly to a Session Initiation Protocol (SIP)-based method, apparatus and system for secure communication between Machine Type Communication (MTC) devices.

BACKGROUND

MTC is a generic term of a series of techniques and combinations thereof for implementing data communication and exchange between machines, or between machines and humans by applying wireless communication technologies. MTC have two meanings, one of which refers to a machine itself, called as an intelligent device in the field of embedding, and the other one refers to a connection between machines to connect the machines through a network. MTC is applied broadly to such as intelligent measurement, remote monitoring, tracking and medical treatment etc., to make human life more intelligent. Compared with traditional communications between humans, MTC devices, which are numerous and applied widely, have a great market prospect.

An SIP is a signaling protocol proposed by the Internet Engineering Task Force (IETF) in 1999 to implement a real-time communication application in an Internet Protocol (IP)-based network, especially in a network environment having such a structure as the Internet, while a so-called session refers to data exchange between users. In an SIP protocol-based application, each session may be contents of various different types, which may be common text data, or may be digitalized audio and video data, or may be data of an application such as a game etc., thus session application is extremely flexible.

Components of an SIP network include an SIP user agent and an SIP server. Distinguished according to logical functions, an SIP network system is composed of four elements: SIP user agents, an SIP proxy server, a redirect server, and an SIP register server.

The SIP user agents, also known as SIP terminals, are ultimate users in the SIP system and defined as an application in a protocol RFC3261. According to different roles the SIP user agents play in sessions, the SIP user agents may be further divided into User Agent Clients (UAC) and User Agent Servers (UAS), wherein the former is configured to initiate a call request while the latter is configured to respond to the call request.

The SIP proxy server, which is an intermediary element, is both a client and a server and is capable of parsing a name, sending a call request to a next hop server on behalf of a user, and then the server determines a next hop address.

The redirect server, which is a server for planning an SIP call path, notifies a user immediately after obtaining a next hop address so that the user initiates a request to the next hop address while the user himself stops control over the call.

The SIP register server is configured to complete login to an UAS. In a network element of the SIP system, all UASs need to log in a certain server so that the UASs can be found by UACs through the server.

The SIP mainly supports the following functions.

1. User location: a location of an end system used by communication is determined;

2. Exchange of user capabilities: an employed medium type and an employed medium parameter are determined;

3. Determination of user availability: whether a called party is in an idle state and is willing to join in communication is determined.

4. Establishment of a call: a called party is invited and prompted, and a call parameter is transmitted between a calling party and the called party.

5. Processing of a call, which includes call termination and call transfer, and etc.

In practical application, the SIP protocol may be applied in a session establishment process in an MTC system.

In an MTC communication system, an MTC device may communicate with other MTC servers or MTC devices through a $3^{rd}$ Generation Partnership Project (3GPP) network. For security reasons, when the MTC device communicates through the 3GPP network, a secure connection needs to be established between the MTC device and an MTC server, or between the MTC device and another MTC device. The secure connection between the MTC device and the MTC server or between the MTC device and the other MTC device belongs to a function of an application layer. For communication between the MTC device and the MTC server, an application layer session key may be generated between the communicating MTC device and MTC server through a Generic Bootstrapping Architecture (GBA) manner or a GBA-push manner, so as to establish the secure connection between the MTC device and the MTC server, thus implementing secure information interaction between the MTC device and the MTC server. Communication between MTC devices may be direct data communication of an application layer. As shown in FIG. 1, the communication between the MTC devices may be also indirect data communication of an application layer, which is performed by the MTC server, as shown in FIG. 2.

In a communication scenario between MTC devices, an application layer session key between the MTC devices cannot be generated directly through the GBA manner or the GBA-push manner. Since two communication parties are MTC devices, a secure connection cannot be established through the GBA manner or the GBA-push manner in communication between the MTC devices. The SIP protocol may be applied in a process of establishing a session between the MTC devices. However, the SIP is only applied to establish a session between the MTC devices. In this case, an application layer session key will not be generated in the process of establishing the session, thus a session connection established by the SIP can hardly ensure secure between the MTC devices. Then, a problem to be solved is how to establish an application layer session key between MTC devices while establishing a session between the MTC devices so as to establish a secure session connection between the communicating MTC devices.

SUMMARY

In view of this, embodiments of the disclosure provide an SIP-based method, apparatus and system for secure communication between MTC devices so as to solve the problem that a session connection established through an SIP can hardly ensure secure communication between MTC devices.

To realize the purpose above, technical solutions of the embodiments of the disclosure are implemented by the following way.

An embodiment of the disclosure provides an SIP-based method for secure communication between MTC devices, wherein the method includes that:

a secure connection between an SIP server and a source MTC device and a secure connection between the SIP server and a target MTC device are established respectively through a GBA manner or a GBA-push manner;

the SIP server generates an application layer session key; the application layer session key is sent to the source MTC device through the secure connection between the SIP server and the source MTC device; the application layer session key is sent to the target MTC through the secure connection between the SIP server and the target MTC device.

The step that the secure connection between the SIP server and the source MTC device and the secure connection between the SIP server and the target MTC device are established respectively through the GBA manner or the GBA-push manner may include that:

the source MTC device sends a SESSION REQUEST to the SIP server;

the SIP server establishes the secure connection between the SIP server and the source MTC device through the GBA manner or the GBA-push manner after receiving the SESSION REQUEST; and the SIP server inquires for an address of the target MTC device according to the SESSION REQUEST, and establishes the secure connection between the SIP server and the target MTC device through the GBA manner or the GBA-push manner.

The step that the secure connection between the SIP server and the source MTC device and the secure connection between the SIP server and the target MTC device are established respectively through the GBA manner or the GBA-push manner may include that:

the source MTC device establishes the secure connection with the SIP server through the GBA manner;

the source MTC device sends a SESSION REQUEST to the SIP server through the secure connection between the source MTC device and the SIP server; and the SIP server inquires for an address of the target MTC device according to the SESSION REQUEST, and establishes the secure connection between the SIP server and the target MTC device through the GBA manner or the GBA-push manner.

After establishing the secure connection between the SIP server and the target MTC device, the method may further include that:

the SIP server forwards the SESSION REQUEST to the target MTC device through the secure connection with the target MTC device; and the target MTC device sends a session response message to the SIP server through the secure connection with the SIP server.

The SIP server may receive the session response message through the secure connection with the target MTC device, and determine, according to the session response message, whether the target MTC device accepts a session invitation of the source MTC device; if the target MTC device accepts the session invitation of the source MTC device, then the SIP server generates an application layer session key according to a key generating algorithm stored in the SIP server.

The step that the secure connection between the SIP server and the source MTC device and the secure connection between the SIP server and the target MTC device are established respectively through the GBA manner or the GBA-push manner may include that:

the source MTC device sends a SESSION REQUEST to the SIP server;

the SIP server establishes the secure connection between the SIP server and the source MTC device through the GBA manner or the GBA-push manner after receiving the SESSION REQUEST;

the SIP server receives the SESSION REQUEST, inquires for an address of the target MTC device according to the SESSION REQUEST, and forwards the SESSION REQUEST to the target MTC device;

the target MTC device sends a session response message to the SIP server; and the SIP server receives the session response message, and determines according to the session response message, whether the target MTC device accepts a session invitation of the source MTC device; if the target MTC device accepts the session invitation of the source MTC device, the SIP server establishes the secure connection with the target MTC device through the GBA manner or the GBA-push manner.

The step that the secure connection between the SIP server and the source MTC device and the secure connection between the SIP server and the target MTC device are established respectively through the GBA manner or the GBA-push manner may include that:

the source MTC device establishes the secure connection with the SIP server through the GBA manner;

the source MTC device sends a SESSION REQUEST to the SIP server through the secure connection between the source MTC device and the SIP server;

the SIP server receives the SESSION REQUEST, inquires for an address of the target MTC device according to the SESSION REQUEST, and forwards the SESSION REQUEST to the target MTC device;

the target MTC device sends a session response message to the SIP server; and the SIP server receives the session response message, and determines, according to the session response message, whether the target MTC device accepts a session invitation of the source MTC device; if the target MTC device accepts the session invitation of the source MTC device, the SIP server establishes the secure connection with the target MTC device through the GBA manner or the GBA-push manner.

The step that the SIP server generates the application layer session key may include that:

after establishing the secure connection with the target MTC device, the SIP server generates the application layer session key according to a key generating algorithm stored in the SIP server.

The step that the secure connection between the SIP server and the source MTC device and the secure connection between the SIP server and the target MTC device are established respectively through the GBA manner or the GBA-push manner may include that:

the source MTC device sends a SESSION REQUEST to the SIP server;

the SIP server receives the SESSION REQUEST, inquires for an address of the target MTC device according to the SESSION REQUEST, and forwards the SESSION REQUEST to the target MTC device;

the target MTC device sends a session response message to the SIP server;

the SIP server receives the session response message, and determines according to the session response message, whether the target MTC accepts a session invitation of the source MTC device; if the target MTC device accepts the session invitation of the source MTC device, the SIP server establishes the secure connection with the source MTC device and the secure connection with the target MTC device respectively through the GBA manner or the GBA-push manner.

The step that the SIP server generates the application layer session key may include that:

after establishing the secure connection with the source MTC device and the secure connection with the target MTC device, the SIP server generates the application layer session key according to a key generating algorithm stored in the SIP server.

After sending the application layer session key to the source MTC device and the target MTC device respectively, the method may further include that the source MTC device encrypts session acknowledgement information through the application layer session key, and sends the session acknowledgement information to the target MTC device directly.

An embodiment of the disclosure further provides an SIP-based system for secure communication between MTC devices. The system includes an SIP server, a source MTC device and a target MTC device, wherein the SIP server is configured to establish a secure connection with the source MTC device and the target MTC device respectively through a GBA manner or a GBA-push manner, and is further configured to generate an application layer session key, to send the application layer session key to the source MTC device through the secure connection with the source MTC device, and to send the application layer session key to the target MTC device through the secure connection with the target MTC device.

The source MTC device may be configured to send a SESSION REQUEST.

The target MTC device may be configured to feed back a session response message.

The SIP server may be further configured to forward the SESSION REQUEST to the target MTC device and forward the session response message to the source MTC device.

The SIP server may be further configured to, after receiving the session response message, determine according to the session response message, whether the target MTC device accepts a session invitation of the source MTC device.

An embodiment of the disclosure further provides an SIP-based apparatus for secure communication between MTC devices, wherein the apparatus includes a secure connection establishing module and a session key generating module, wherein the secure connection establishing module is configured to establish a secure connection between an SIP server and a source MTC device and a secure connection between the SIP server and a target MTC device respectively through a GBA manner or a GBA-push manner;

the session key generating module is configured to generate an application layer session key, send the application layer session key to the source MTC device through the secure connection between the SIP server and the source MTC device, and send the application layer session key to the target MTC device through the secure connection between the SIP server and the target MTC device.

The apparatus may further include a determining module, which is configured to forward to the target MTC device a SESSION REQUEST sent by the source MTC device, and forward to the source MTC device a session response message fed back by the target MTC device, and is further configured to determine, according to the session response message, whether the target MTC device accepts a session invitation of the source MTC device.

In the SIP-based method, system and apparatus for secure communication between MTC devices according to the embodiments of the disclosure, a secure connection between an SIP server and a source MTC device and a secure connection between the SIP server and a target MTC device are established respectively through a GBA manner or a GBA-push manner; the SIP server generates an application layer session key, and sends the application layer session key to the source MTC device and the target MTC device respectively through the secure connections with the source MTC device and the secure connections with the target MTC device. In the solutions above, communication between MTC devices is implemented by session connections established based on SIP. An application layer session key between a source MTC device and a target MTC device is generated during a process of establishing a session connection so as to establish a secure session connection between MTC devices in communication, thus solving the security problem of communication between MTC devices.

DETAILED DESCRIPTION

The technical solutions of the disclosure will be further expounded in conjunction with the accompanying drawings and specific embodiments.

A solution of secure communication between MTC devices according to the embodiments of the disclosure is that a secure connection between an SIP server and a source MTC device and a secure connection between the SIP server and a target MTC device are established respectively through a GBA manner or a GBA-push manner during an SIP-based establishment of a session between MTC devices, and an application layer session key generated by the SIP server is sent to the source MTC device and the target MTC device respectively, thus implementing establishment of secure session connections between the MTC devices.

In an embodiment of the disclosure, an MTC device refers to a device applied to machine-to-machine communication in a mobile communication network. A Universal Integrated Circuit Card (UICC) is arranged in the MTC device, and a module for identifying a user identity (e.g. a Subscriber Identity Module (SIM), a Universal Subscriber Identity Module (USIM) and an Internet Protocol (IP) Multimedia Services Identity Module (ISIM) etc.) is located on the UICC.

Figure 1:
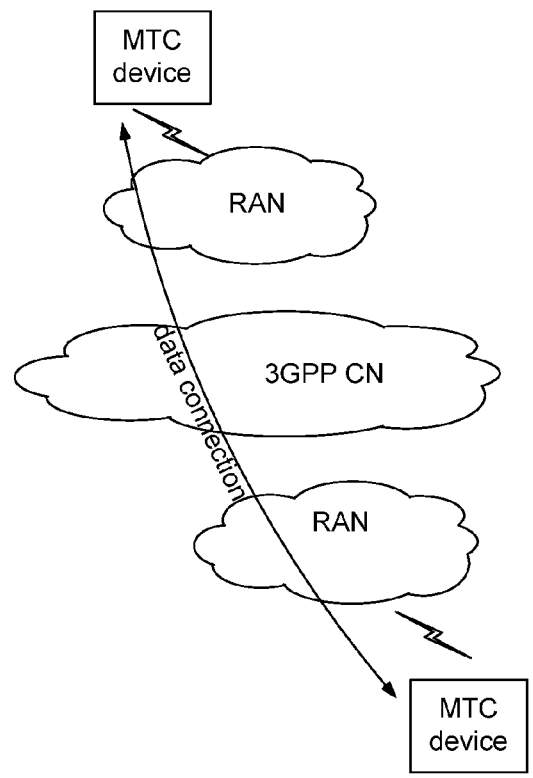
FIG. 1 is a schematic diagram of direct communication between MTC devices.
Figure 2:
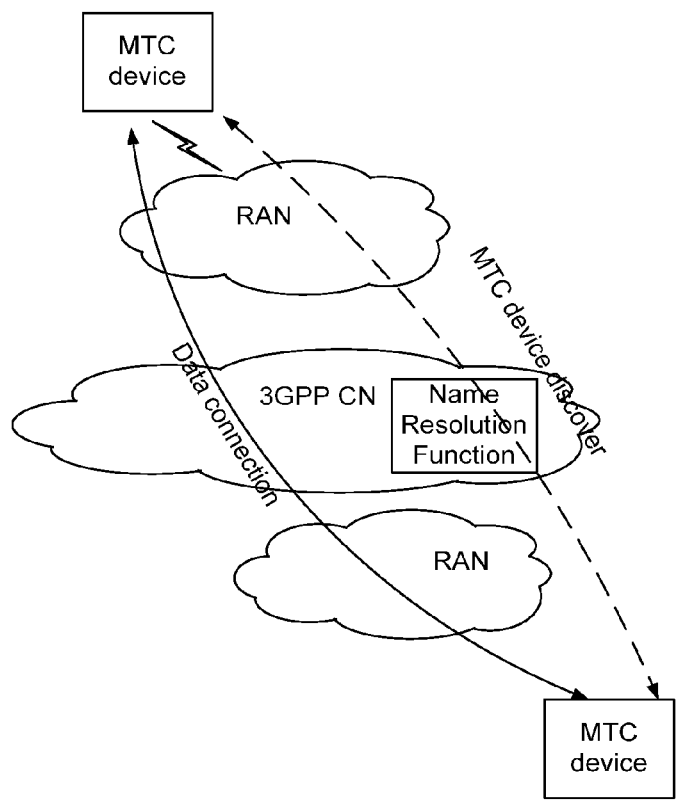
FIG. 2 is a schematic diagram of communication between MTC devices through an MTC server.
Figure 3:
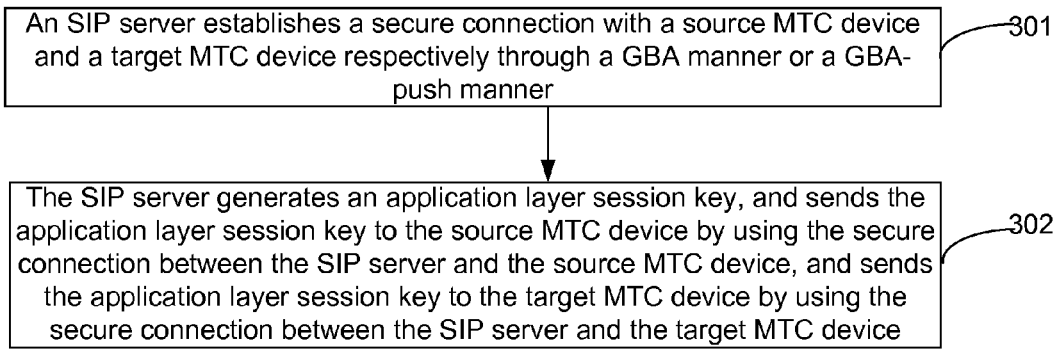
FIG. 3 is an SIP-based method for secure communication between MTC devices according to an embodiment of the disclosure.

As shown in FIG. 3, an SIP-based method for secure communication between MTC devices according to an embodiment of the disclosure includes the following steps:

Step 301: A secure connection between an SIP server and a source MTC device and a secure connection between the SIP server and a target MTC device are established respectively through a GBA manner or a GBA-push manner; and Step 302: The SIP server generates an application layer session key, and sends the application layer session key to the source MTC device and the target MTC device respectively through the secure connection between the SIP server and the source MTC device and through the secure connection between the SIP server and the target MTC device.

The technical solutions above will be illustrated through specific embodiments as below.

Figure 4:
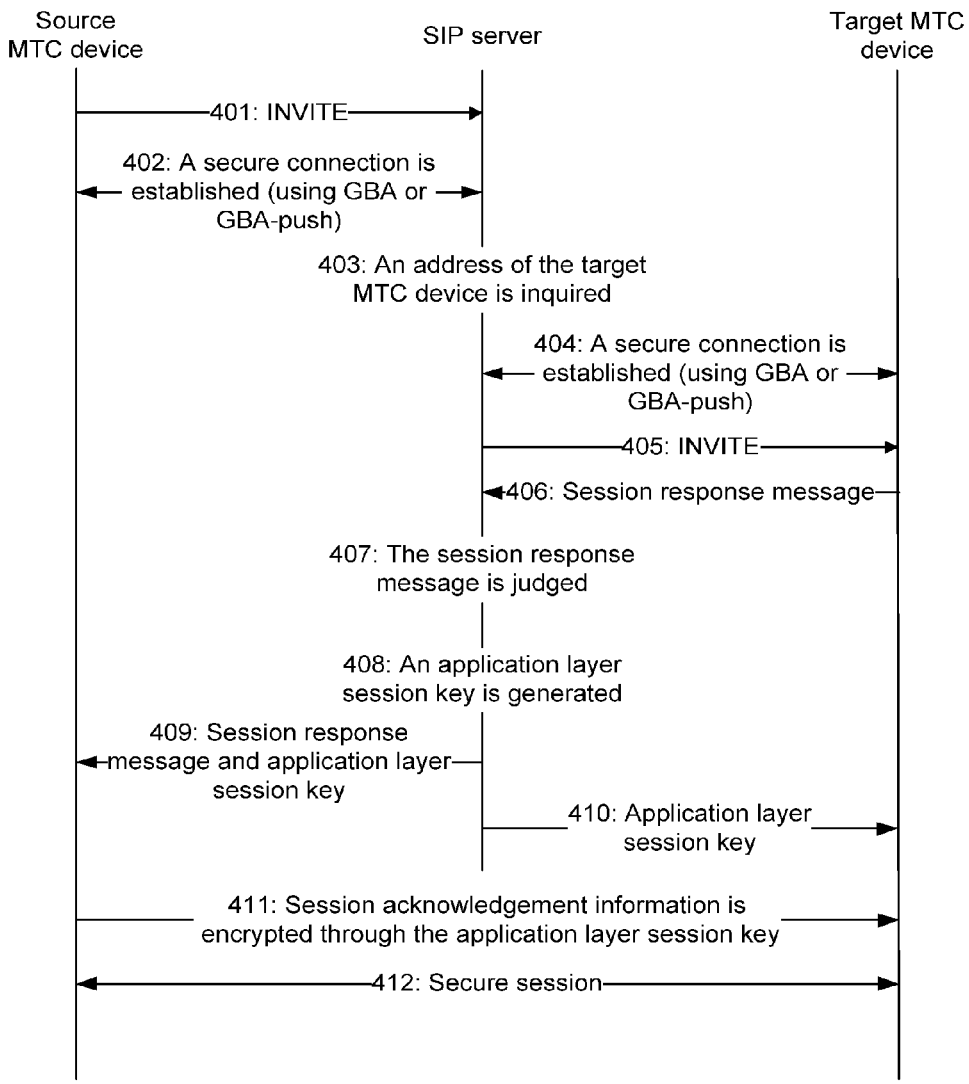
FIG. 4 is an implementation process of SIP-based secure communication between MTC devices according to the first embodiment of the disclosure.

FIG. 4 shows a process of SIP-based secure communication between MTC devices according to the first embodiment of the disclosure, including the following steps:

Step S401: A source MTC device sends a SESSION REQUEST (i.e., INVITITE) to a target MTC device, and the SESSION REQUEST is sent to an SIP server first;

Step S402: After receiving the SESSION REQUEST, the SIP server establishes a secure connection between the SIP server and the source MTC device through a GBA manner (or may be also a GBA-push manner);

Step S403: The SIP server inquires for an address of the target MTC device according to the SESSION REQUEST;

Step S404: The SIP server establishes a secure connection between the SIP server and the target MTC device through the GBA manner (or may be also the GBA-push manner);

Step S405: The SIP server sends the SESSION REQUEST to the target MTC device through the secure connection with the target MTC device;

Step S406: The target MTC device sends a session response message to the source MTC device; the session response message is sent to the SIP server first through the secure connection between the target MTC device and the SIP server;

Step S407: The SIP server receives the session response message and determines according to the session response message, whether the target MTC device accepts a session invitation of the source MTC device; if the target MTC device accepts the session invitation of the source MTC device, Step S408 is performed, otherwise, the SIP server forwards the session response message to the source MTC device directly and the process ends;

Step S408: The SIP server generates an application layer session key according to a key generating algorithm stored in the SIP server;

Step S409: The SIP server sends the application layer session key and the session response message to the source MTC device through the secure connection with the source MTC device;

Step S410: The SIP server sends the application layer session key to the target MTC device through the secure connection with the target MTC device;

Step S411: The source MTC device encrypts session acknowledgement information through the application layer session key and sends the session acknowledgement information to the target MTC device directly, in this way, a secure session connection is established between the source MTC device and the MTC device; and Step S412: The source MTC device and the target MTC device start data interaction based on the secure session connection to perform a session securely.

Figure 5:
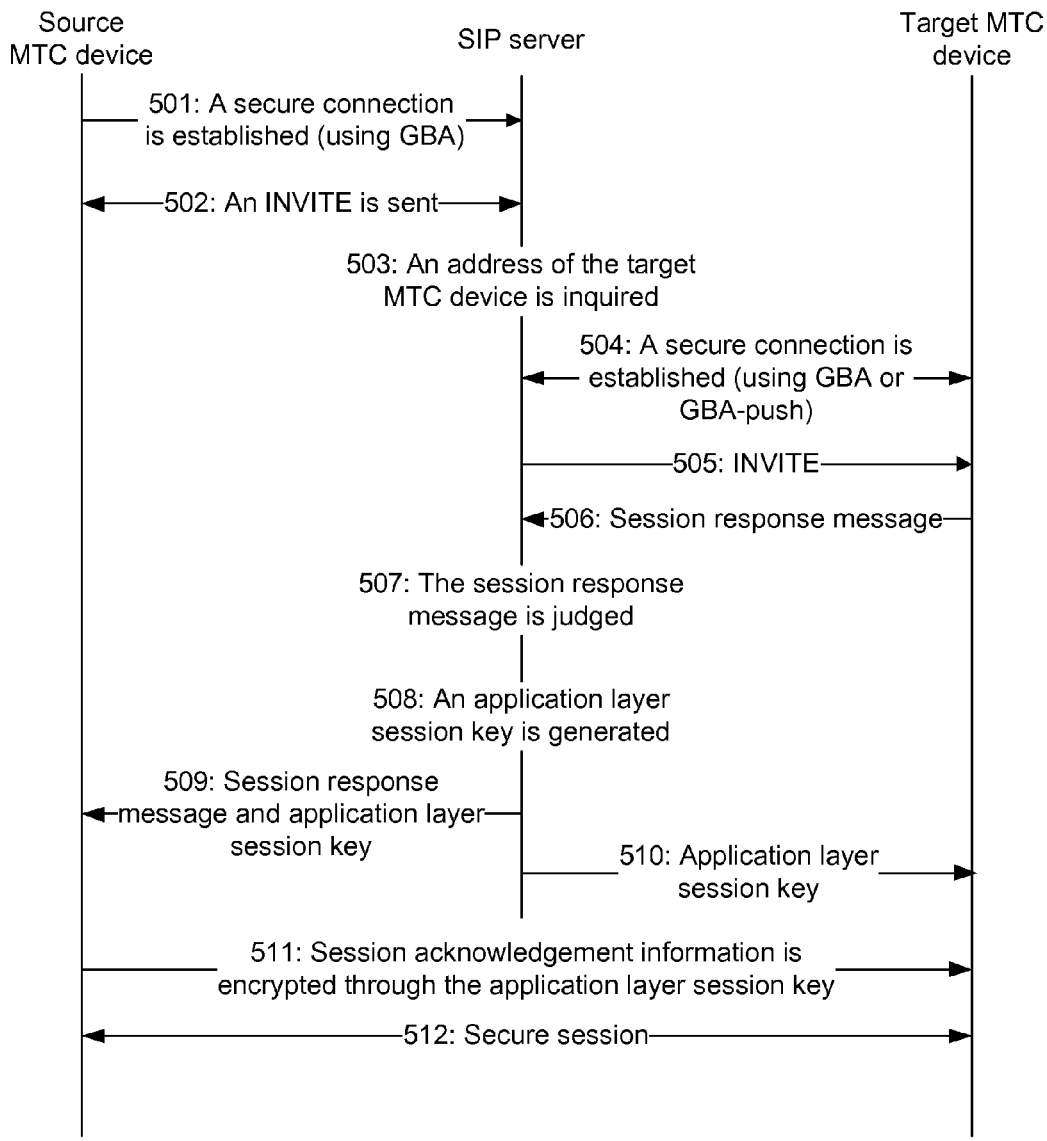
FIG. 5 is an implementation process of SIP-based secure communication between MTC devices according to the second embodiment of the disclosure.

FIG. 5 shows a process of SIP-based secure communication between MTC devices according to the second embodiment of the disclosure, including the following steps:

Step S501: A source MTC device establishes a secure connection with an SIP server through a GBA manner;

Step S502: The source MTC device sends a SESSION REQUEST to a target MTC device; the SESSION REQUEST is sent to the SIP server first through the secure connection between the source MTC device and the SIP server.

Step S503: The SIP server inquires for an address of the target MTC device through the SESSION REQUEST;

Step S504: The SIP server establishes a secure connection between the SIP server and the target MTC device through a GBA manner (or may be a GBA-push manner);

Step S505: The SIP server forwards the SESSION REQUEST to the target MTC device through the secure connection with the target MTC device;

Step S506: The target MTC device sends a session response message to the source MTC device; the session response message is sent to the SIP server first through the secure connection between the target MTC device and the SIP server;

Step S507: The SIP server receives the session response message and determines according to the session response message, whether the target MTC device accepts a session invitation of the source MTC device; if the target MTC device accepts the session invitation of the source MTC device, Step S508 is performed, otherwise, the SIP server forwards the session response message to the source MTC device directly and the process ends;

Step S508: The SIP server generates an application layer session key according to a key generating algorithm stored in the SIP server;

Step S509: The SIP server sends the application layer session key and the session response message to the source MTC device through the secure connection with the source MTC device;

Step S510: The SIP server sends the application layer session key to the target MTC device through the secure connection with the target MTC device;

Step S511: The source MTC device encrypts session acknowledgement information through the application layer session key and sends the session acknowledgement information to the target MTC device directly, in this way, a secure session connection is established between the source MTC device and the MTC device; and Step S512: The source MTC device and the target MTC device start data interaction based on the secure session connection to perform a session securely.

Figure 6:
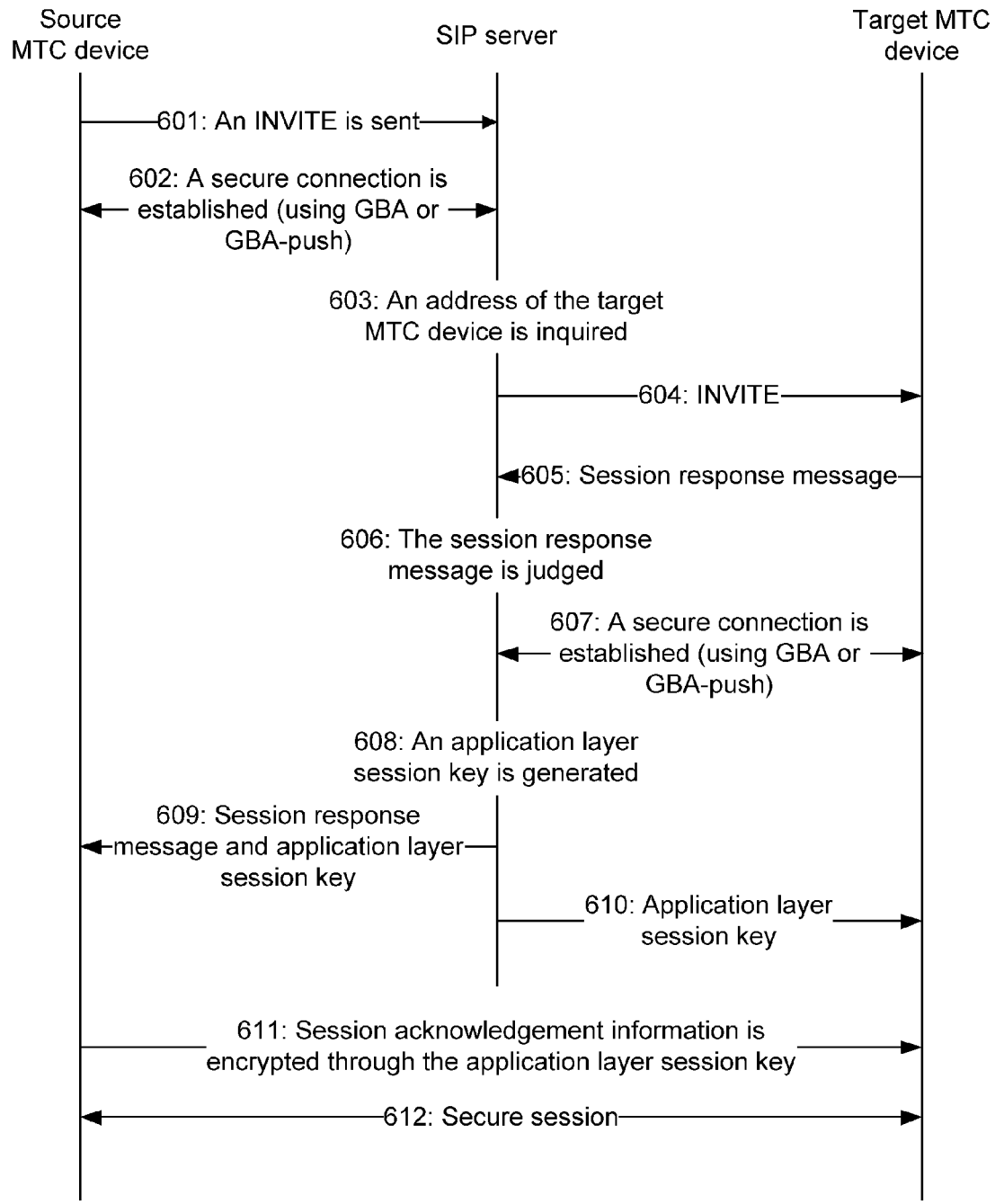
FIG. 6 is an implementation process of SIP-based secure communication between MTC devices according to the third embodiment of the disclosure.

FIG. 6 shows a process of SIP-based secure communication between MTC devices according to the third embodiment of the disclosure, including the following steps:

Step S601: A source MTC device sends a SESSION REQUEST to a target MTC device, and the SESSION REQUEST is sent to an SIP server first;

Step S602: After receiving the SESSION REQUEST, the SIP server establishes a secure connection between the SIP server and the source MTC device through a GBA manner (or may be also a GBA-push manner);

Step S603: The SIP server inquires for an address of the target MTC device according to the SESSION REQUEST;

Step S604: The SIP server forwards the SESSION REQUEST to the target MTC device;

Step S605: The target MTC device sends a session response message to the source MTC device; the session response message is sent to the SIP server first;

Step S606: The SIP server receives the session response message and determines according to the session response message, whether the target MTC device accepts a session invitation of the source MTC device; if the target MTC device accepts the session invitation of the source MTC device, Step S607 is performed, otherwise, the SIP server forwards the session response message to the source MTC device directly and the process ends;

Step S607: The SIP server establishes a secure connection between the SIP server and the target MTC device through the GBA manner (or may be also the GBA-push manner);

Step S608: The SIP server generates an application layer session key according to a key generating algorithm stored in the SIP server;

Step S609: The SIP server sends the application layer session key and the session response message to the source MTC device through the secure connection with the source MTC device;

Step S610: The SIP server sends the application layer session key to the target MTC device through the secure connection with the target MTC device;

Step S611: The source MTC device encrypts session acknowledgement information through the application layer session key and sends the session acknowledgement information to the target MTC device directly. In this way, a secure session connection is established between the source MTC device and the MTC device; and Step S612: The source MTC device and the target MTC device start data interaction based on the secure session connection to perform a session securely.

Figure 7:
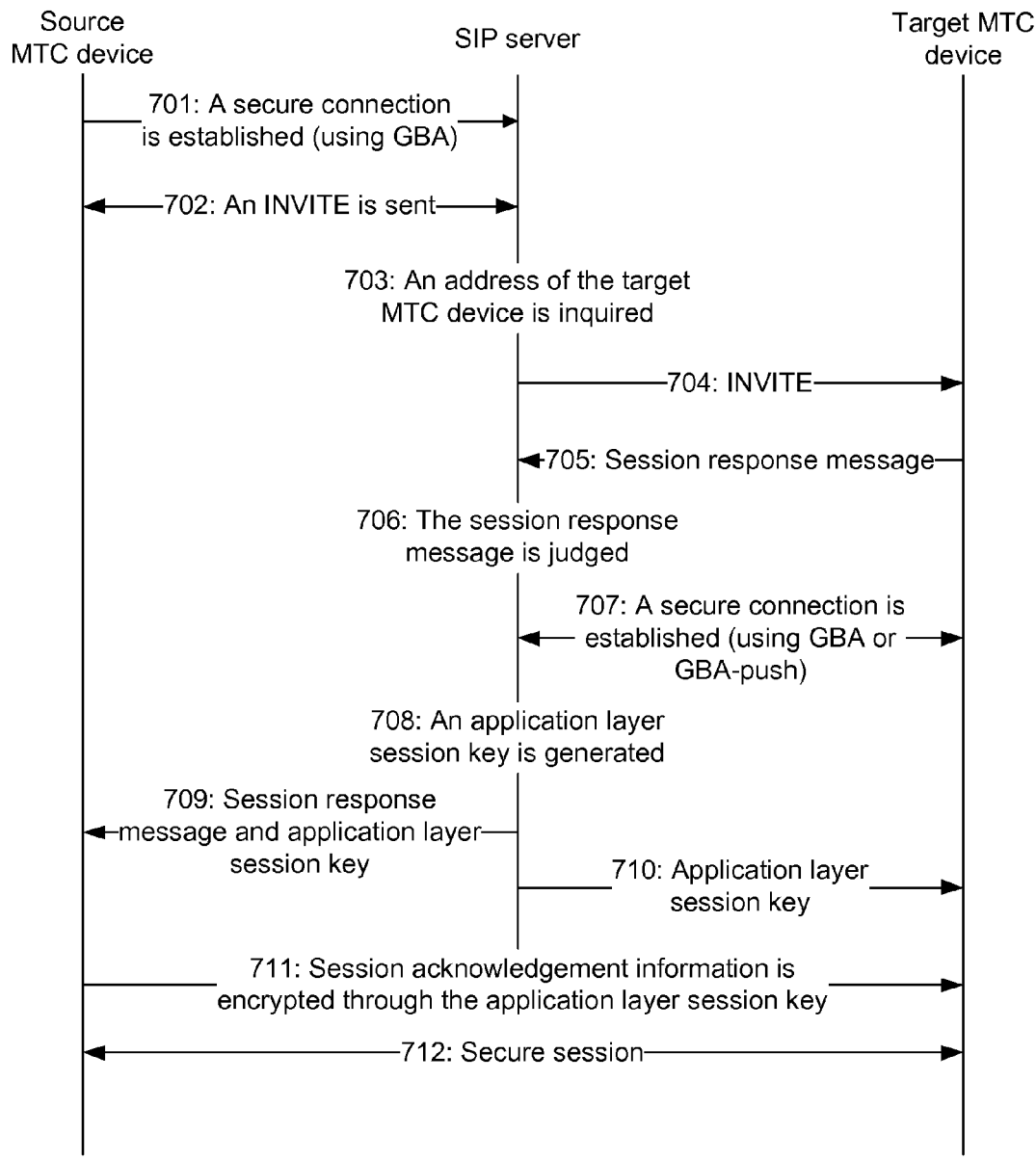
FIG. 7 is an implementation process of SIP-based secure communication between MTC devices according to the fourth embodiment of the disclosure.

FIG. 7 shows a process of SIP-based secure communication between MTC devices according to the fourth embodiment of the disclosure, including the following steps:

Step S701: A source MTC device establishes a secure connection with an SIP server through a GBA manner;

Step S702: The source MTC device sends a SESSION REQUEST (INVITIE) to a target MTC device; the SESSION REQUEST is sent to the SIP server first through the secure connection between the source MTC device and the SIP server;

Step S703: The SIP server inquires for an address of the target MTC device through the SESSION REQUEST;

Step S704: The SIP server forwards the SESSION REQUEST to the target MTC device;

Step S705: The target MTC device sends a session response message to the source MTC device; the session response message is sent to the SIP server first;

Step S706: The SIP server receives the session response message and determines according to the session response message, whether the target MTC device accepts a session invitation of the source MTC device; if the target MTC device accepts the session invitation of the source MTC device, Step S707 is performed; otherwise, the SIP server forwards the session response message to the source MTC device directly and the process ends;

Step S707: The SIP server establishes a secure connection between the SIP server and the target MTC device through the GBA manner (or may be also the GBA-push manner);

Step S708: The SIP server generates an application layer session key according to a key generating algorithm stored in the SIP server;

Step S709: The SIP server sends the application layer session key and the session response message to the source MTC device through the secure connection with the source MTC device;

Step S710: The SIP server sends the application layer session key to the target MTC device through the secure connection with the target MTC device;

Step S711: The source MTC device encrypts session acknowledgement information through the application layer session key and sends the session acknowledgement information to the target MTC device directly. In this way, a secure session connection is established between the source MTC device and the MTC device; and Step S712: The source MTC device and the target MTC device start data interaction based on the secure session connection to perform a session securely.

Figure 8:
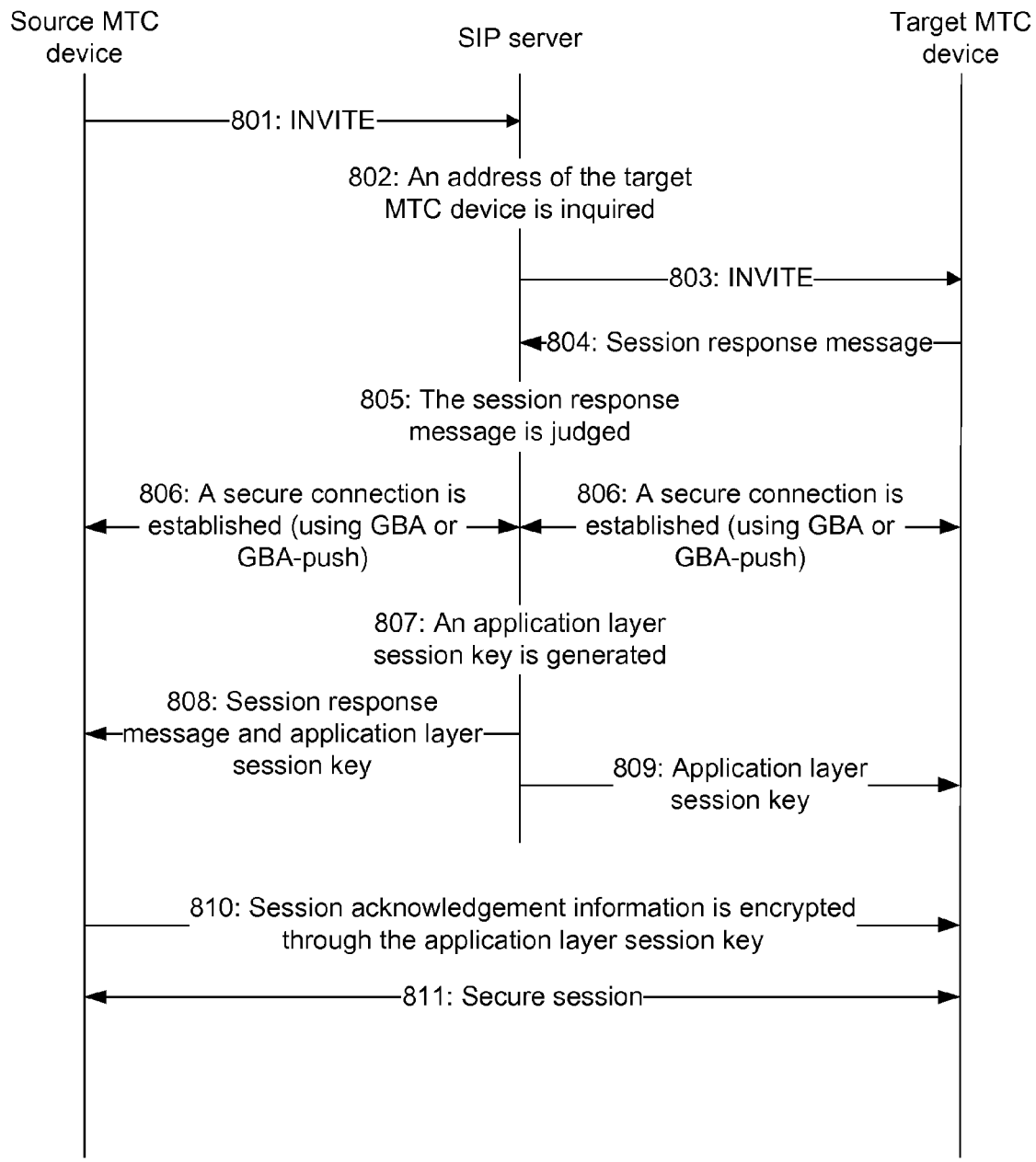
FIG. 8 is and implementation process of SIP-based secure communication between MTC devices according to the fifth embodiment of the disclosure.

FIG. 8 shows a process of SIP-based secure communication between MTC devices according to the fifth embodiment of the disclosure, including the following steps:

Step S801: A source MTC device sends a SESSION REQUEST to a target MTC device, and the SESSION REQUEST is sent to an SIP server first;

Step S802: After receiving the SESSION REQUEST, the SIP server inquires for an address of the target MTC device according to the SESSION REQUEST;

Step S803: The SIP server forwards the SESSION REQUEST to the target MTC device;

Step S804: The target MTC device sends a session response message to the source MTC device; the session response message is sent to the SIP server first;

Step S805: The SIP server receives the session response message and determines according to the session response message, whether the target MTC device accepts a session invitation of the source MTC device; if the target MTC device accepts the session invitation of the source MTC device, Step 506 is performed, otherwise, the SIP server forwards the session response message to the source MTC device directly and the process ends;

Step S806: The SIP server establishes a secure connection between the SIP server and the source MTC device through a GBA manner (or may be also a GBA-push manner); in the meanwhile, the SIP server also establishes a secure connection between the SIP server and the target MTC device through the GBA manner (or may be also the GBA-push manner);

Step S807: The SIP server generates an application layer session key according to a key generating algorithm stored in the SIP server;

Step S808: The SIP server sends the application layer session key and the session response message to the source MTC device through the secure connection with the source MTC device;

Step S809: The SIP server sends the application layer session key to the target MTC device through the secure connection with the target MTC device;

Step S810: The source MTC device encrypts session acknowledgement information through the application layer session key and sends the session acknowledgement information to the target MTC device directly, in this way, a secure session connection is established between the source MTC device and the MTC device; and Step S811: The source MTC device and the target MTC device start data interaction based on the secure session connection to perform a session securely.

Through the technical solutions above, a secure connection may be established between MTC devices based on an SIP protocol during communication between the MTC devices.

Figure 9:
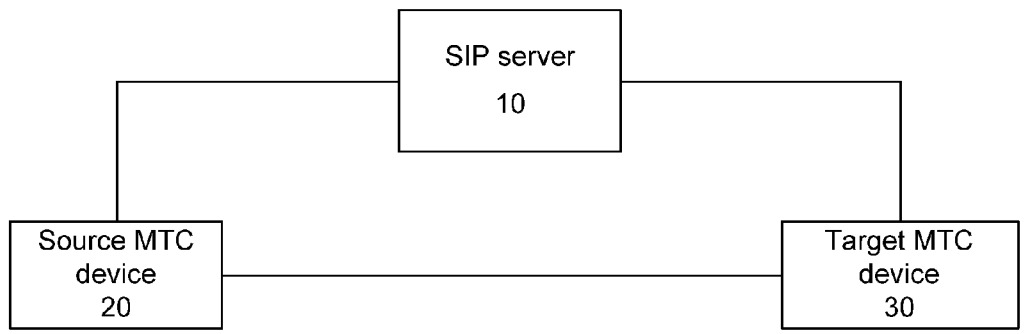
FIG. 9 is a schematic diagram of an SIP-based system for secure communication between MTC devices according to an embodiment of the disclosure.

FIG. 9 shows a schematic diagram of an SIP-based system for secure communication between MTC devices according to an embodiment of the disclosure.

The system includes an SIP server 10, a source MTC device 20 and a target MTC device 30, wherein the SIP server 10 is configured to establish a secure connection with the source MTC device 20 and a secure connection with the target MTC device 30 respectively through a GBA manner or a GBA-push manner, and is further configured to generate an application layer session key, to send the application layer session key to the source MTC device 20 through the secure connection with the source MTC device 20, and to send the application layer session key to the target MTC device 30 through the secure connection with the target MTC device 30.

The source MTC device 20 is configured to send a SESSION REQUEST.

The target MTC device 30 is configured to feed back a session response message.

Accordingly, the SIP server 10 is further configured to forward the SESSION REQUEST to the target MTC device 30 and forward the session response message to the source MTC device 20. The SIP server 10 is further configured to, after receiving the session response message, determine according to the session response message, whether the target MTC device 30 accepts a session invitation of the source MTC device 20.

In the embodiment of the disclosure, the SIP server 10 may be an SIP register server, or an SIP server of other types.

Figure 10:
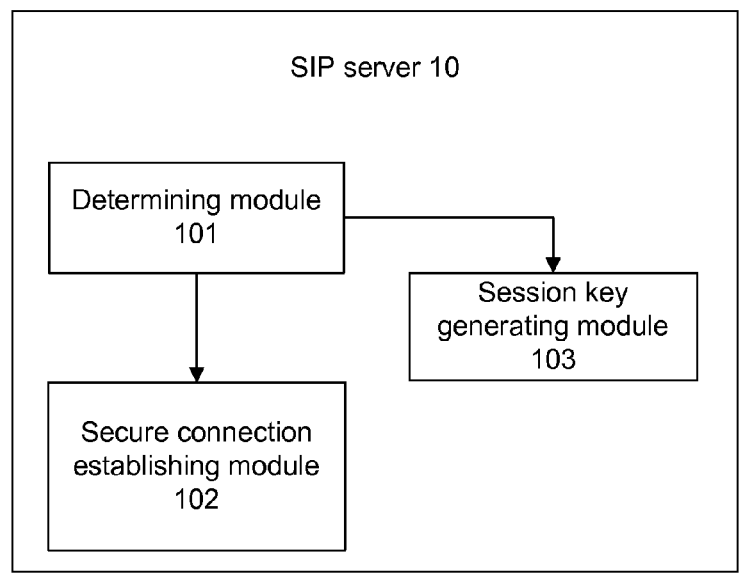
FIG. 10 is a schematic diagram of an SIP-based apparatus for secure communication between MTC devices according to an embodiment of the disclosure.

FIG. 10 shows a structure block diagram of an SIP-based apparatus for secure communication between MTC devices according to an embodiment of the disclosure. Preferably, the apparatus is applied to an SIP server 10. As illustrated in the figure, the apparatus includes a determining module 101, a secure connection establishing module 102 and a session key generating module 103, wherein the determining module 101 is configured to forward a SESSION REQUEST sent by a source MTC device 20 to a target MTC device 30, and to forward a session response message fed back by the target MTC device 30 to the source MTC device 20, and is further configured to determine, according to the session response message, whether the target MTC device 30 accepts a session invitation of the source MTC device 20;

the secure connection establishing module 102 is configured to establish a secure connection between the SIP server and a source MTC device 20 and a secure connection between the SIP server and the target MTC device 30 respectively through a GBA manner or a GBA-push manner;

the session key generating module 103 is configured to generate an application layer session key, to send the application layer session key to the source MTC device 20 through the secure connection between the SIP server and the source MTC device 20, and to send the application layer session key to the target MTC device 30 through the secure connection between the SIP server and the target MTC device 30.

Besides, the determining module 101, the secure connection establishing module 102 and the session key generating module 103 may be implemented by a Central Processing Unit (CPU), a Micro Processing Unit (MPU), a Digital Signal Processor (DSP) or a Field-Programmable Gate Array (FPGA) in an SIP-based apparatus for secure communication between MTC devices.

In the embodiments of the disclosure, communication between MTC devices is implemented by session connections established based on SIP. An application layer session key between a source MTC device and a target MTC device is generated during a process of establishing a session connection so as to establish a secure session connection between communicating MTC devices, thus solving the security problem of communication between MTC devices.

Apparently, those skilled in the art shall understand that the modules or the steps of the disclosure may be implemented by a general-purpose computing device and they may be centralized on a single computing device or distributed over a network consisting of a plurality of computing devices. Optionally, they may be implemented using program codes executable by a computing device so that they may be stored in a storage device and executed by the computing device. In addition, the steps as illustrated or described may be executed according to a sequence different from that described herein in some cases, or they may be implemented by fabricating them into integrated circuit modules respectively or by fabricating a plurality of modules or steps of them into a single integrated circuit module. Thus, the disclosure is not limited to any specific combination of hardware and software.

The foregoing descriptions are only preferred embodiments of the disclosure and are not used for limiting the protection scope of the disclosure.

What is claimed is:

1. A Session Initiation Protocol (SIP)-based method for secure communication between Machine Type Communication (MTC) devices, comprising:

establishing a secure connection between an SIP server and a source MTC device and a secure connection between the SIP server and a target MTC device respectively through a Generic Bootstrapping Architecture (GBA) manner or a GBA-push manner;

generating, by the SIP server, an application layer session key;

sending, by the SIP server, the application layer session key to the source MTC device through the secure connection between the SIP server and the source MTC device;

sending, by the SIP server, the application layer session key to the target MTC through the secure connection between the SIP server and the target MTC device;

encrypting, by the source MTC device, session acknowledgement information through the application layer session key;

sending, by the source MTC device, the session acknowledgement information to the target MTC device directly to establish a secure session connection between the source MTC device and the target MTC device; and starting, by the source MTC device and the target MTC device, data interaction based on the secure session connection to perform a session.

2. The SIP-based method for secure communication between MTC devices according to claim 1, wherein establishing the secure connection between the SIP server and the source MTC device and the secure connection between the SIP server and the target MTC device respectively through the GBA manner or the GBA-push manner comprises:

sending, by the source MTC device, a SESSION REQUEST to the SIP server;

establishing, by the SIP server, the secure connection between the SIP server and the source MTC device through the GBA manner or the GBA-push manner after receiving the SESSION REQUEST; and inquiring, by the SIP server, for an address of the target MTC device according to the SESSION REQUEST, and establishing, by the SIP server, the secure connection between the SIP server and the target MTC device through the GBA manner or the GBA-push manner.

3. The SIP-based method for secure communication between MTC devices according to claim 2, after establishing the secure connection between the SIP server and the target MTC device, the method further comprising:

forwarding, by the SIP server, the SESSION REQUEST to the target MTC device through the secure connection with the target MTC device; and sending, by the target MTC device, a session response message to the SIP server through the secure connection with the SIP server.

4. The SIP-based method for secure communication between MTC devices according to claim 3, wherein the SIP server receives the session response message through the secure connection with the target MTC device, and determines, according to the session response message, whether the target MTC device accepts a session invitation of the source MTC device; if the target MTC device accepts the session invitation of the source MTC device, the SIP server generates an application layer session key according to a key generating algorithm stored in the SIP server.

5. The SIP-based method for secure communication between MTC devices according to claim 1, wherein establishing the secure connection between the SIP server and the source MTC device and the secure connection between the SIP server and the target MTC device respectively through the GBA manner or the GBA-push manner comprises:

establishing, by the source MTC device, the secure connection with the SIP server through the GBA manner;

sending, by the source MTC device, a SESSION REQUEST to the SIP server through the secure connection between the source MTC device and the SIP server; and inquiring, by the SIP server, for an address of the target MTC device according to the SESSION REQUEST, and establishing, by the SIP server, the secure connection between the SIP server and the target MTC device through the GBA manner or the GBA-push manner.

6. The SIP-based method for secure communication between MTC devices according to claim 5, after establishing the secure connection between the SIP server and the target MTC device, the method further comprising:

forwarding, by the SIP server, the SESSION REQUEST to the target MTC device through the secure connection with the target MTC device; and sending, by the target MTC device, a session response message to the SIP server through the secure connection with the SIP server.

7. The SIP-based method for secure communication between MTC devices according to claim 6, wherein the SIP server receives the session response message through the secure connection with the target MTC device, and determines, according to the session response message, whether the target MTC device accepts a session invitation of the source MTC device; if the target MTC device accepts the session invitation of the source MTC device, the SIP server generates an application layer session key according to a key generating algorithm stored in the SIP server.

8. The SIP-based method for secure communication between MTC devices according to claim 1, wherein establishing the secure connection between the SIP server and the source MTC device and the secure connection between the SIP server and the target MTC device respectively through the GBA manner or the GBA-push manner comprises:

sending, by the source MTC device, a SESSION REQUEST to the SIP server;

establishing, by the SIP server, the secure connection between the SIP server and the source MTC device through the GBA manner or the GBA-push manner after receiving the SESSION REQUEST;

receiving, by the SIP server, the SESSION REQUEST, inquiring, by the SIP server, for an address of the target MTC device according to the SESSION REQUEST, and forwarding, by the SIP server, the SESSION REQUEST to the target MTC device;

sending, by the target MTC device, a session response message to the SIP server; and receiving, by the SIP server, the session response message, and determining, by the SIP server according to the session response message, whether the target MTC device accepts a session invitation of the source MTC device; if the target MTC device accepts the session invitation of the source MTC device, establishing, by the SIP server, the secure connection with the target MTC device through the GBA manner or the GBA-push manner.

9. The SIP-based method for secure communication between MTC devices according to claim 8, wherein generating, by the SIP server, the application layer session key comprises:

after establishing the secure connection with the target MTC device, generating, by the SIP server, the application layer session key according to a key generating algorithm stored in the SIP server.

10. The SIP-based method for secure communication between MTC devices according to claim 1, wherein establishing the secure connection between the SIP server and the source MTC device and the secure connection between the SIP server and the target MTC device respectively through the GBA manner or the GBA-push manner comprises:

establishing, by the source MTC device, the secure connection with the SIP server through the GBA manner;

sending, by the source MTC device, a SESSION REQUEST to the SIP server through the secure connection between the source MTC device and the SIP server;

receiving, by the SIP server, the SESSION REQUEST, inquiring, by the SIP server, for an address of the target MTC device according to the SESSION REQUEST, and forwarding, by the SIP server, the SESSION REQUEST to the target MTC device;

sending, by the target MTC device, a session response message to the SIP server; and receiving, by the SIP server, the session response message, and determining, by the SIP server according to the session response message, whether the target MTC device accepts a session invitation of the source MTC device; if the target MTC device accepts the session invitation of the source MTC device, establishing, by the SIP server, the secure connection with the target MTC device through the GBA manner or the GBA-push manner.

11. The SIP-based method for secure communication between MTC devices according to claim 10, wherein generating, by the SIP server, the application layer session key comprises:
   after establishing the secure connection with the target MTC device, generating, by the SIP server, the application layer session key according to a key generating algorithm stored in the SIP server.

12. The SIP-based method for secure communication between MTC devices according to claim 1, wherein establishing the secure connection between the SIP server and the source MTC device and the secure connection between the SIP server and the target MTC device respectively through the GBA manner or the GBA-push manner comprises:
   sending, by the source MTC device, a SESSION REQUEST to the SIP server;
   receiving, by the SIP server, the SESSION REQUEST, inquiring, by the SIP server, for an address of the target MTC device according to the SESSION REQUEST, and forwarding, by the SIP server, the SESSION REQUEST to the target MTC device;
   sending, by the target MTC device, a session response message to the SIP server; and
   receiving, by the SIP server, the session response message, and determining, by the SIP server according to the session response message, whether the target MTC accepts a session invitation of the source MTC device; if the target MTC device accepts the session invitation of the source MTC device, establishing, by the SIP server, the secure connection with the source MTC device and the secure connection with the target MTC device respectively through the GBA manner or the GBA-push manner.

13. The SIP-based method for secure communication between MTC devices according to claim 12, wherein generating, by the SIP server, the application layer session key comprises:
   after the SIP server establishes the secure connection with the source MTC device and the secure connection with the target MTC device, generating, by the SIP server, the application layer session key according to a key generating algorithm stored in the SIP server.

14. The SIP-based method for secure communication between MTC devices according to claim 1, after sending the application layer session key to the source MTC device and the target MTC device respectively, the method further comprising:
   encrypting, by the source MTC device, session acknowledgement information through the application layer session key, and sending, by the source MTC device, the session acknowledgement information to the target MTC device directly.

15. A Session Initiation Protocol (SIP)-based system for secure communication between Machine Type Communication (MTC) devices, comprising an SIP server, a source MTC device and a target MTC device, wherein
   the SIP server is configured to establish a secure connection with the source MTC device and a secure connection with the target MTC device respectively through a Generic Bootstrapping Architecture (GBA) manner or a GBA-push manner, and is further configured to generate an application layer session key, to send the application layer session key to the source MTC device through the secure connection with the source MTC device, and to send the application layer session key to the target MTC device through the secure connection with the target MTC device;
   the source MTC device is configured to encrypt session acknowledgement information through the application layer session key;
   the source MTC device is configured to send the session acknowledgement information to the target MTC device directly to establish a secure session connection between the source MTC device and the target MTC device; and
   the source MTC device and the target MTC device are configured to start data interaction based on the secure session connection to perform a session.

16. The SIP-based system for secure communication between MTC devices according to claim 15, wherein
   the source MTC device is configured to send a SESSION REQUEST;
   the target MTC device is configured to feed back a session response message;
   the SIP server is further configured to forward the SESSION REQUEST to the target MTC device and forward the session response message to the source MTC device.

17. The SIP-based system for secure communication between MTC devices according to claim 16, wherein the SIP server is further configured to, after receiving the session response message, determine according to the session response message, whether the target MTC device accepts a session invitation of the source MTC device.

* * * * *